E. B. AULT.
BEE CAGE.
APPLICATION FILED MAR. 19, 1918.

1,353,137.

Patented Sept. 21, 1920.

Eugene B. Ault
Inventor

By Geo. P. Kimmel
Attorney

UNITED STATES PATENT OFFICE.

EUGENE B. AULT, OF CALALLEN, TEXAS.

BEE-CAGE.

1,353,137. Specification of Letters Patent. Patented Sept. 21, 1920.

Application filed March 19, 1918. Serial No. 223,344.

*To all whom it may concern:*

Be it known that I, EUGENE B. AULT, a citizen of the United States, residing at Calallen, in the county of Nueces and State of Texas, have invented certain new and useful Improvements in Bee-Cages, of which the following is a specification.

This invention relates to a shipping cage construction for transporting bees and has for its object to provide a strong open type cage of this character provided with a novel, efficiently operating apparatus for feeding the bees during transit in combination with means adjacent thereto about which the bees may cluster, the construction being such as to permit and facilitate the proper ventilation of the air through the cage to prevent the bees from smothering.

Further objects of this invention are to provide an open work cage of the character specified with means to prevent the placing of other packages around the cage in such a manner as to shut off the ventilation and thus smother the bees *en route.*

Referring to the drawings,

Figure 1 is a perspective view of one embodiment of this invention showing a portion of the wire mesh front broken away while.

Figure 1:
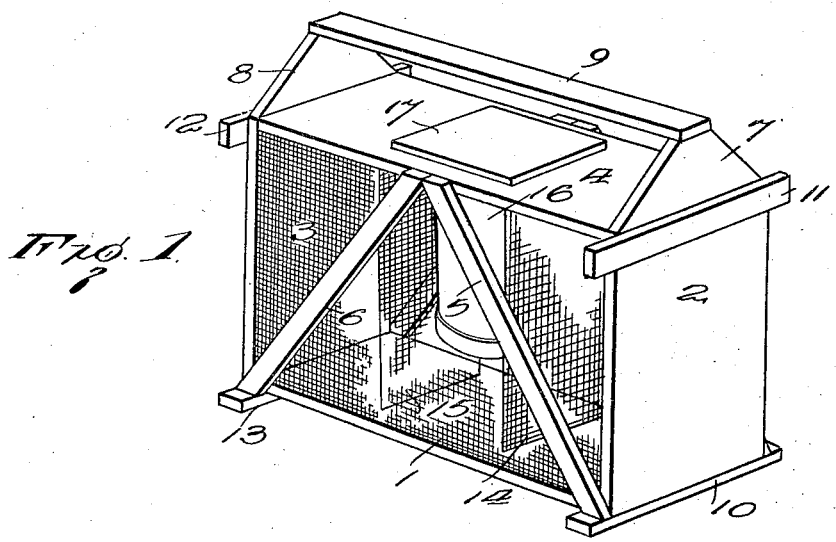

In the preferred form of my device shown in Fig. 1, a rectangular frame having a bottom 1, sides 2 and 3 and top 4, is provided with transversely and angularly arranged braces 5 and 6 located on the front and rear sides of the cage. The top 4 is protected by the upwardly extending triangular portion 7 and 8 of the sides 2 and 3, and the top of these pieces are connected with a brace and handle 9. If desired strips 10, 11, 12 and 13 may be provided at each corner of the main frame of the cage to extend slightly beyond the edges or front and rear faces thereof for preventing the placing of other articles or packages adjacent these faces of the case which might stop off circulation of air and subject the bees to the danger of smothering in transit.

The wire cloth screens 14 and 15 extend from the top wall 4 down to the bottom 1 of the cage and form the means upon which the bees may cluster about my novel type of vacuum feeding apparatus 16 placed between these screens 14 and 15.

The automatic feeding mechanism 16 is made by supporting a closed bottomed receptacle in an inverted position in the cage on a base 17 in any suitable manner through an opening in the top 4. The lid 18 of the can 16 is provided with a plurality or small number of perforations 18' through which a liquid or syrup placed in the receptacle 16 will slowly feed as the same is sucked out by the bees and since the bottom of the receptacle is closed the feeding of the liquid tends to form a vacuum in the upper part of the receptacle so that the feed may be nicely regulated and automatically controlled in this manner.

Figure 2:
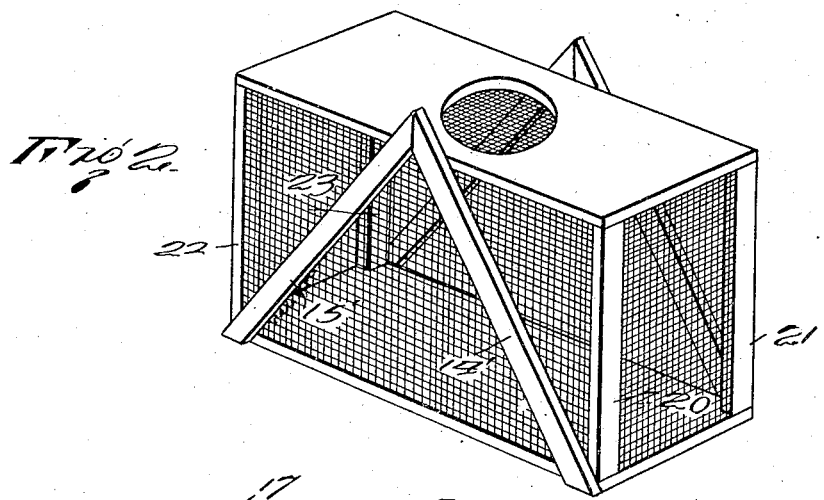
Fig. 2 is a similar view of a modification.
Figure 3:
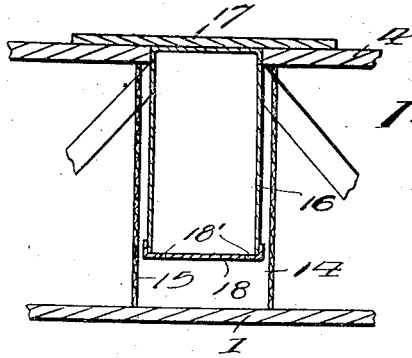
Fig. 3 is a detailed vertical sectional view of the vacuum feeding apparatus.

In the modification of Fig. 2 the end walls 2 and 3 of the frame as shown in Fig. 1 are replaced by corner posts 20, 21, 22, and 23 and the diagonal braces 14' and 15' extend above the top wall 4 to form a projecting means for indicating the top of the cage and preventing the cage from being turned over. The braces 14' and 15' prevent packages from being placed up against the front and rear walls of the cage and the posts 20, 21, 22 and 23 permit the cage to have a longitudinal ventilation through the same as well as a transverse circulation of air through the open front and rear sides.

It will be understood that in both forms of my device a wire screening, not shown, is secured upon the open sides of the cage to form a complete closure so as to prevent the escape of bees within the cage.

Having thus described my invention I claim:

A portable shipping bee cage construction, comprising a frame having top and bottom, vertical end pieces connecting said top and bottom, wire mesh sides, bee clustering means within the frame, means for feeding bees and disposed relative to the clustering means and suspended from the top, and projecting portions on the frame constructed and arranged to extend beyond the top to prevent the frame from being placed in inverted position or receiving any article upon its top.

In testimony whereof, I affix my signature hereto.

EUGENE B. AULT.